Patented May 9, 1950

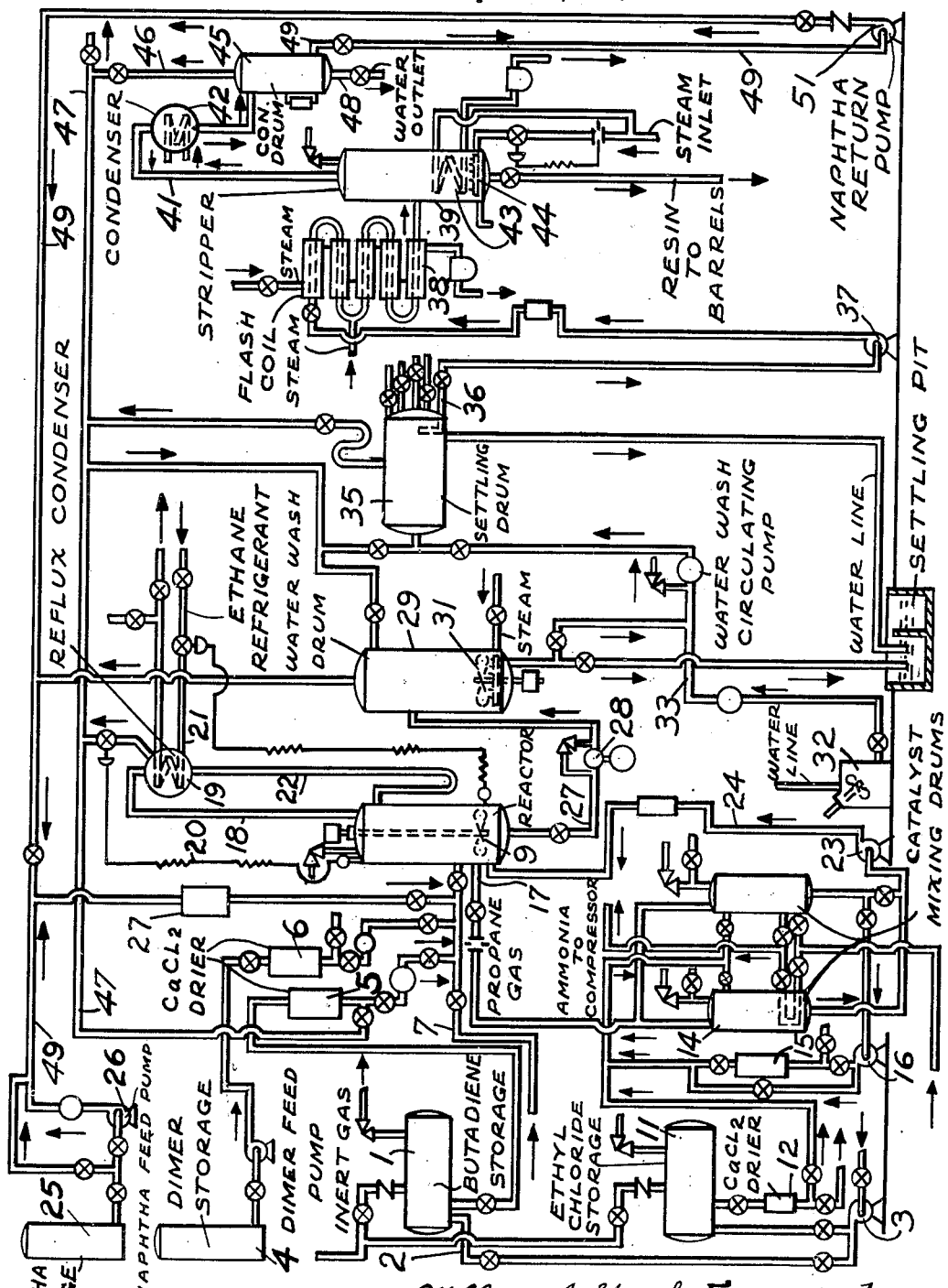

2,507,100

UNITED STATES PATENT OFFICE 2,507,100

RESIN PROCESS

John D. Garber, Cranford, William J. Sparks, Westfield, and David W. Young, Roselle, N. J., assignors to Standard Oil Development Company, a corporation of Delaware Application April 17, 1946, Serial No. 662,693

10 Claims. (Cl. 260—85.3)

This invention relates to olefinic polymers, relates particularly to the production of light colored polymeric resins, and relates especially to means for reducing to the lowest possible value color-producing iron contaminants.

It has been found possible to produce an extremely valuable synthetic resin from a mixture of mono-olefins and multi-olefins in which mixture there may be present from 30 per cent to 80 per cent of a multi-olefin such as butadiene or other multi-olefins having from 4 to 14 carbon atoms per molecule with the remainder consisting of a mono olefin having 5 to about 20 carbon atoms or a normal olefin having from 3 to 20 carbon atoms, by the application to the mixture of a Friedel-Crafts catalyst at temperatures ranging from about +10 to —30° C. to produce a resin which is not an elastomer but is a hard, solid, hydrocarbon-soluble substance having many of the characteristics of the natural varnish gums and resins. However, difficulty has been encountered in the production of these resins because of the tendency of the resin to assume a more or less deep yellow to brown color which reduces its value for the making of clear varnish compositions.

It is now found that if the resin, in solution in light solvent is carefully washed with water or with the water solutions of moderately alkaline substances such as soda followed by a thorough water wash and is then dried and the solvent flashed out in the shortest possible time, with a minimum of contact with iron-containing structures, a resin can be obtained which is nearly water white.

For this purpose, the resin solution is delivered from the reactor to a wash tank where it is washed preferably with water to remove as completely as possible all traces of aluminum and iron, settled to remove as much as possible of the insoluble cross-linked material and then passed through a double pipe heat exchanger in which the resin solution is in contact for as short a time as possible with a non-ferrous tube structure containing less than 5 per cent iron impurity; and the emergent molten resin is collected and further purified in a similar non-ferrous drum receiver. The preferred material for the tube and receiver is the copper nickel alloy known as "Monel" metal. By this procedure the amount of iron in the resin can be kept below amounts as low as 5 to 25 parts per million and at these values the resin is transparent and practically water white.

Thus the invention polymerizes a diolefin such as butadiene in proportions from 30% to 80% with a mono olefin such as diisobutylene in proportions from 70% to 20% at temperatures within the range between +10 and —30° C. by the application thereto, in the presence of a diluent such as liquid propane or butane, if desired, of a Friedel-Crafts catalyst such as aluminum chloride in solution in ethyl or methyl chloride or AlBr₃ in solution in hydrocarbons such as butane, hexane or the like to yield a solution of resin in unpolymerized diolefin, mono-olefin, catalyst solvent and diluent. After the polymerization reaction has been carried to the desired stage, the reaction mixture is washed repeatedly with water or with a very mild alkali such as a sodium bicarbonate solution and then, with further repeated washings of water, until a condition of neutrality is obtained; that is, a pH of about 7. The washed solution is then settled to remove the gel and the cross-linked, insoluble material, and is then passed through a heat exchanger and flash volatilization device made from a material substantially free from iron, preferably Monel metal (copper nickel alloy), or nichrome (nickel chromium alloy), or glass lined equipment the length of time of contact with the hot metal being sharply limited to four minutes or less, the molten liquid resin being collected in a similar non-ferrous receiver, where it is further steam-stripped by a current of superheated live steam and a heating coil, and the molten resin is then piped to storage packages. Other objects and details of the invention will be apparent from the following description when read in connection with the accompanying drawing, wherein the single figure is a diagrammatic representation of apparatus and process steps according to the invention.

The raw material for the present invention is a low temperature resin prepared from a multi-olefin and a mono-olefin. The preferred multi-olefin is butadiene, but any substituted butadiene or any multi-olefin having more than one double linkage is useable; including such substances as isoprene, piperylene, the several dimethyl butadienes, dimethallyl, myrcene, divinyl benzene, allo-ocymene, and the like, any multi-olefinic substance having two or more double linkages per molecule, and from 4 to 14 carbon atoms being useful. This material is copolymerized with a mono olefin such as propylene, or normal butylene, all of the pentenes, hexenes, heptenes, octenes, nonenes, and the like, up to about 20 carbon atoms being equally useful. That is, all of the normal mono olefins having from 3 to 20 carbon atoms inclusive are useful and all of the secondary and tertiary mono olefins from 5 to 20 carbon atoms, similarly being equally useful (isobutylene is not useable in this reaction since its high polymerization reactivity results in the polymerization of the isobutylene with a relatively very small amount of the multi olefin, yielding a wholly different, rubbery, type of substance, or a thick oil not a hard resin).

The preferred mixture is from 30% to 80% of the multi-olefin, preferably butadiene because of its cheapness and availability, with from 70% to 20% of diisobutylene, also because of its cheapness and availability. These materials are mixed, diluted with an appropriate amount of a diluent such as liquid propane and polymerized by the addition of the appropriate catalyst.

Referring to the drawing, the butadiene is stored in tank 1 to which it is delivered through a pipe 2 by a pump 3, the suction of which is drawn from some such supply as a tank car. Simultaneously, the dimer is stored in a tank 4 after receipt from the refinery or other convenient source. Preparatory to use, the butadiene is passed through a calcium chloride dryer 5 and the dimer through a calcium chloride dryer 6. Both dryers discharge through a pipe 7 into the reactor 8. The reactor contains a propeller stirrer 9 which is driven by an appropriate motor, (not shown). Simultaneously, a supply of ethyl chloride is stored in the container 11, to which it likewise is delivered from tank cars or other source of supply. The ethyl chloride likewise is passed through a calcium chloride dryer 12 to one or the other of mixing drums 14. From the mixing drums 14, the ethyl chloride is circulated through an aluminum chloride dissolver 15 by a pump 16 until a sufficiently strong solution of aluminum chloride is obtained in the drums 14.

In the meantime, an appropriate amount of liquid propane is delivered to the reactor 8 through a pipe line 17. The propane is volatilized by the warmth of the butadiene and dimer in the reactor 8 and passes upward through the pipe 18 to a reflux condenser 19, cooled with liquid ethane delivered through the supply pipe 21. The reflux of cold propane flows downward through the pipe 22, back into the reactor 8. This reflux cooling is continued until the material is brought down to the desired temperature which is determined by the mixed boiling point of the contents of the reactor, the amount of propane present being brought to a value such that the mixed boiling point is at the desired temperature. It may be noted that while liquid propane is in some ways preferable, gaseous propane is useable, since after introduction, it is cooled in the reflux condenser 19 and delivered as liquid through the pipe 22 to the reactor 8. When the desired temperature is reached, the catalyst is delivered by the pump 23 through pipe 24 to the reactor 8 in the form of a fine, high-pressure jet which is very rapidly stirred into the olefin-containing mixture. The reaction proceeds promptly to yield the desired polymer resin. The rate of reaction is to a considerable extent determined by the rate of catalyst delivery, and the rate of delivery is preferably kept at a comparatively low value to avoid undue temperature rise in the reactor; that is, with a reactor containing 550 pounds of butadiene and 450 pounds of dimer dissolved in approximately 700 pounds of propane, approximately 75 gallons of a 3% aluminum chloride solution in ethyl chloride are required for conversion of approximately 75% of the olefinic material; and this amount of catalyst is delivered over a time interval of approximately 1 to 2 hours. When the reaction has reached the desired stage, a supply of light naphtha from the storage tank 25 is delivered by a pump 26 through a calcium chloride dryer 27 to the reactor 8 where it is well stirred in by the stirrer 9. When a solution of the desired concentration has been obtained by this means, a valve in the pipe 27 is opened and the pump 28 drains the solution of polymer from the reactor 9 and delivers it to a wash tank 29 equipped with a stirrer 31. Simultaneously, water from a tank 32 is delivered through pipe 33 to the washer 29. The wash water is at a temperature considerably above the temperature of the polymerizate solution, and considerably above the boiling point of the ethyl chloride, the unreacted butadiene, and the propane. Accordingly, these components of the reaction mixture are volatilized out and discharged through an outlet pipe from the washer 29, whereafter, they may be sent to a flare for burning or may be recovered, recycled and reused in subsequent polymerizations.

The pump 34 serves to circulate the wash water and polymer solution to obtain as complete a washing as possible; at intervals the stirrer 31 is allowed to stop and the wash water or wash solution is drained off and replaced by fresh water; to avoid troublesome emulsions the wash water is preferably left at 130–150° F. When the material has been washed to the desired stage and has reached a condition of neutrality, as is shown by tests of the wash water; from 3 to 11 successive washings, each using a volume of water approximately equal to the volume of light naphtha solution being required. The polymer solution is then transferred by the pump 34 to a settling drum 35 in which the insoluble cross-linked resin settles out. The clear upper portion is then decanted through a pipe 36 to a pump 37 by which it is delivered through a non-ferrous steam jacketed pipe system 38.

This system consists of an inner pipe made of a non-ferrous material such as Monel metal or nichrome or copper, or the like, or is glass lined and is surrounded by a jacket of high pressure steam at from 105 to 250 pounds per square inch pressure. The polymer solution delivered by the pump 37 into the inner pipe is rapidly heated to a temperature above the melting point of the resin, usually far enough above the melting point to leave the resin in a relatively fluid form, and, accordingly, the rate of passage is quite rapid. To facilitate complete removal of solvents from the resin, a stream of superheated steam is introduced into the coil at a point where the temperature of the resin mass is above 212° F.

(usually about midway of the length of the coil); this point being chosen in order that the temperature may be above the condensation point of water.

The steam serves as a stripping agent to carry forward and away as much as possible of the light naphtha. Instead of steam, such substances as nitrogen, carbon dioxide, clean flue gas, or other inert gaseous material which shows a low solubility in the polymer may be used.

A one-inch internal diameter pipe, constructed of Monel metal, having an overall length of 40 feet will handle approximately 1.6 gallons of polymer solution per minute when the solution contains 50% of resin. The obtainable flow rates and the characteristics of the material are well shown in the following table:

| Feed Rate, Gal./Min. | Live Steam Rate, Mole/Mole $C_8H_{16}$ | Polymer Temperature @ Exit, °C. | Properties of Resin | | |
|---|---|---|---|---|---|
| | | | Varnish Color | Ash, Wt. | Fe |
| | | | | | Per cent |
| 0.1 | 3 | 140 | 18+ | .73 | .004 |
| 0.2 | 3 | 137 | 18+ | .34 | .0012 |
| 0.4 | 3 | 133 | 16 (green) | .08 | .0010 |
| 0.6 | 3 | 130 | 12 | .03 | .0004 |
| 1.5 | 8.7 | 125 | 11 | .02 | .0004 |
| 2.0 | 8.7 | Resin not dry, Tacky. | | | |

The coil was thoroughly washed with diisobutylene between each of the above runs to avoid contamination. The resin produced was a 55-butadiene 45-dimer type resin which had a melting point of 91° C., and when finished in glass had the following properties: varnish color=11, ash=0.02% and iron=0.0004%. Thus the polymer solution must be fed to the equipment at a rate of 0.6 to 1.5 gal./min. in equipment of the stated design in order to maintain product quality.

It may be noted that even the best of Monel and nichrome alloys will contain from 2 to 6 or 7% iron, and some of this iron is unavoidably absorbed by the resin. However, if the time of passage of the hot resin through the heater tube is less than four or five minutes, the amount of iron picked up by the hot resin is less than about 10 parts per million, which does not cause a serious amount of discoloration.

From the exit end of the Monel pipe, the resin is discharged to a disengaging drum 39 in which the molten resin is separated from the non-polymerized material at a temperature of approximately 280° F. From the drum 39 any residual, unpolymerized dimer and light naphtha added to the polymerizer to dilute the solution are driven off through the pipe 41 to the condenser 42. Simultaneously, the temperature in the receiver 39 is maintained by a steam coil 43 and by open steam from a distributor 44. In the condenser 42, the water, the dimer, and the added naphtha are condensed and delivered to a receiver 45. The water is drained out through a pipe 48 and sent to the sewer, and the naphtha, with small amounts of dimer, and so on, is drained out through the pipe 49 and returned by the pump 51 to the naphtha storage.

In the recovery of this copolymer resin it is essential that a relatively narrow range of conditions of temperature and throughput through the coil must be obtained and these values are critical; thus, if the rate of flow of the resin solution through the coil is too low, or the temperature is too low, the contact time is unduly long and the final resin is greenish in color or a dark brown, and not satisfactory for the manufacture of light-colored paints and varnishes; and if the rate of flow is too high, incomplete separation occurs. Accordingly, the rate of flow and temperature must be adjusted according to the diameter and length of the pipe through which the resin solution flows so that time is long enough and temperature high enough to free the solution from volatile components, and the rate of flow is fast enough and the temperature low enough to prevent the contamination with iron to an extent sufficient to discolor the resin. In the embodiment herein, as above described, a Monel metal coil having a diameter of 1 inch and a length of 40 feet was used, surrounded with a steam jacket at a pressure of 105 lbs./sq. in.

In the device and process above described, a substantial amount of light naphtha diluent is delivered directly to the polymerizer, but with the reflux condenser attached, the temperature does not rise above the boiling point of the lower-boiling components, and, accordingly, a very fluid solution is delivered by the pump 28 to the washer 31. This method of operation is, however, not necessary. Instead, the pipe 18 leading to the reflux condenser may be closed by a valve before the naphtha is introduced, and the naphtha may be warmed substantially before being introduced. Under these circumstances, the light volatiles may be discharged through a pipe 20 leading from the top of the reactor to a recovery and recycle system (not shown) by which the butadiene, the methyl chloride, and the propane are separated by a fractional distillation and stored in proper storage tanks for reuse. By this procedure, a somewhat heavier, more viscous solution is delivered by the pump 28 to the washer 29, and substantially no light volatiles are disengaged in the washer. This procedure has some points of value in that it permits of recovery and reuse of many of the components; on the other hand, the cost of equipment and power for the fractional distillation may, in some instances, amount to more than the value of the recovered materials.

It is of interest to note the surprising power of iron to degrade the color of this hydrocarbon type resin. The resin is wholly free from acid substituents and should be wholly non-corrosive. Nevertheless, at high temperatures, its attraction for traces of iron is phenomenally and unexpectedly high, to such an extent that it can not be processed readily in iron equipment, even stainless steel, without a serious or fatal contamination by iron which, in amounts above about 100 parts per million, yields a deep yellow color, and, in amounts above 1000 parts per million, yields a brown, opaque resin. Accordingly, the process of the present invention washes out the iron, aluminum and similar material as carefully as possible to bring the resin solution to a closely neutral condition, and then removes the solvent by a heat treatment in the absence of ferrous structures to maintain as low an iron content as possible.

EXAMPLE I

A series of polymerizations were conducted, as above outlined, and successive portions of the various polymerizations were processed in the Monel metal coil above described.

The results are summarized in the following table:

Table No. I—Test runs on flash coil, resin plant

[Equipment: 40 ft. of 1" Monel pipe, steam jacketed. Steam injection at middle of coil. Steam pressure: 114-117 P. S. I. G.]

| Batch No. | Coil Test, Run No. | Feed Rate, G.P.M., Solution | Steam to Coil | | | Coil Temp., °F. | | | Heat Transfer | | Vapor Vel., Ft./Sec. | | | Entrainment From Disengaging Drum |
|---|---|---|---|---|---|---|---|---|---|---|---|---|---|---|
| | | | Lb./Hr. | Mols/Mol. Solv. | | Inlet | Middle Before Steam | Outlet | Basis Heat Pickup | Basis Steam Consumption | 1" Coil Outlet | 12" Drum | 3" Drum | |
| | | | | Excl. H₂O in Feed | Incl. H₂O in Feed | | | | | | | | | |
| 73-74-75 | 1 | 0.056 | 98 | 75 | 75 | 68 | 216 | 290 | (d) 4,300 | (d) ------ | (a) 141 | (b) 1.1 | (c) ------ | No observation. |
| | 2 | 0.173 | 98 | 24.3 | 24.6 | 68 | 215 | 237 | 11,000 | 67,000 | 136 | 1.0 | ------ | Do. |
| | 3 | 1.58 | 98 | 2.6 | 3.0 | 68 | 185 | 237 | 101,000 | 82,000 | 194 | 1.5 | ------ | Yes, very heavy. |
| | 4 | 0.77 | 128 | 7.1 | 7.5 | 68 | 200 | 264 | 54,000 | 131,000 | 207 | 1.6 | ------ | Do. |
| Btms | 5 | ------ | ------ | ------ | ------ | ------ | ------ | ------ | ------ | ------ | ------ | ------ | ------ | Do. |
| 76 | 1 | 1.09 | 49 | 1.5 | 3.1 | 63 | 170 | 225 | 115,000 | 87,000 | 168 | 1.3 | ------ | Do. |
| | 2 | 0.86 | 98 | 3.9 | 5.4 | 63 | 197 | 240 | 93,000 | 70,000 | 214 | 1.6 | ------ | Do. |
| Btms | 3 | 0.154 | 49 | 10.8 | 12.3 | 63 | 187 | 282 | ------ | ------ | 113 | 0.87 | ------ | No observation. |
| 77 | 1 | 0.965 | 135 | 5.4 | 5.4 | 58 | 177 | 245 | 64,000 | 94,000 | 211 | 1.5 combined | ------ | Yes, very heavy. |
| | 2 | 0.204 | 44 | 8.3 | 8.3 | 58 | 220 | 280 | 14,000 | 32,000 | 69 | ------ | 8.1 | Not apparent (f). |
| | 3 | 0.139 | 0 | 0.0 | 0.06 | 58 | 228 | 292 | 9,400 | 25,000 | 5.4 | ------ | 0.64 | Do. |
| | 4 | 0.083 | Trace | ------ | ------ | ------ | ------ | ------ | ------ | ------ | ------ | ------ | ------ | |

FEED COMPOSITION AND TREATMENT

| Batch | Composition, weight percent | | | S. P. Grav. | Resin Type Butadiene-Dimer Ratio | Washing Procedure—Water: Approx. 8 gal. per 45 gals. sol'n each wash | Final Acidity, pH |
|---|---|---|---|---|---|---|---|
| | Solids | Solvent (Dimer) | H₂O | | | | |
| 73, 74, 75 | 64.2 | 33.8 | (e) 2.0 | 0.862 | 55/45 (wt.) | 5 water, 0.6 weight percent dry NAHCO₃ +2 water. | 6 |
| 76 | 45.5 | 43.7 | 10.8 | 0.84 | 55/45 (wt.) | 7 water | 7 |
| 77 | 61.5 | 38.1 | 0.4 | 0.84 | 55/45 (wt.) | 6 water | 6 |

NOTES (a) Based on 0.006 sq. ft. cross section.
(b) Based on 0.785 sq. ft. cross section. 0 p. s. i. g. and coil outlet temp.; drum temp. actually lower since not steam jacketed.
(c) Based on 0.051 sq. ft. cross section. 0 p. s. i. g. and coil outlet temp.; drum is steam jacketed.
(d) Discrepancies in heat transfer may in large part be explained by variations in H₂O content of feed solution; see note (e).
(e) Samples taken may not be representative as regards H₂O content.
(f) Entrained resin issuing from vapor line believed to be material from run No. 1. Flow of this material slowed up considerably during course of run No. 2.

PRODUCT QUALITY

| Softening Pt. | Loss, weight percent | Color | Cast | Iron | Ash | Gel |
|---|---|---|---|---|---|---|
| | | | | Per cent | Per cent | Per cent |
| 96 | 5.1 | 12 | Green | .004 | .73 | 0.90 |
| 94 | 3.1 | 11 | Slight Gr | .0012 | .34 | 2.6 |
| 60 | 3.2 | 11 | No Gr | .0004 | .02 | .01 |
| 66 | 7.3 | 11 | ---do--- | .004 | .03 | 0.2 |
| | 2.1 | 11-12 | Green | | | .01 |
| 60 | 5.4 | 9 | No Gr | .00013 | .01 | 0.25 |
| 60 | 4.1 | 9 | ---do--- | .00013 | .008 | 0.30 |
| | 1.5 | 10 | Slight Gr | | | |
| 88 | 3.1 | 10 | Trace Gr | .0001 | .01 | 0.6 |
| 93 | 3.5 | 10 | ---do--- | .00075 | .01 | 0.2 |
| 91 | 4.6 | 10 | ---do--- | .00025 | .015 | 0.3 |
| 93 | 3.7 | 10 | ---do--- | .00012 | .015 | 0.5 |

The results above set out show the excellent quality of the polymer obtainable and the efficiency of operations of the procedure above described.

Thus the process of the invention polymerizes an olefinic mixture, washes the mixture to substantial neutrality, dries the mixture and flashes it through a heated non-ferrous material coil to remove solvents in the shortest possible time with the least opportunity for the absorption of iron contaminants.

While there is above disclosed but a single embodiment of the process and product of the invention, it is possible to produce still other embodiments without departing from the inventive concept herein disclosed and it is therefore desired that only such limitations be imposed on the appended claims as are stated therein or required by the prior art.

The invention claimed is:

1. In the processing of a fusible copolymeric resin, prepared from a mixture containing from 30% to 80% of a multi-olefin, having from 4 to 14 carbon atoms per molecule, and from 20% to 70% of a mono-olefin, having from 5 to 20 inclusive carbon atoms per molecule, by the application to the mixture of a Friedel-Crafts catalyst, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated metal surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes.

2. In the processing of a fusible copolymeric resin, prepared from a mixture containing from 30% to 80% of a multi-olefin, having from 4 to 14 carbon atoms per molecule, and from 20% to 70% of a mono-olefin, having from 5 to 20 inclusive carbon atoms per molecule, by the application to the mixture of a Friedel-Crafts catalyst, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated metal surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes, and carrying away volatile components by the application to the hot resin material of a stream of super-heated steam.

3. In the processing of a fusible copolymeric resin, prepared from a mixture containing from 30% to 80% of a multi-olefin, having from 4 to 14 carbon atoms per molecule, and from 20% to 70% of a mono-olefin, having from 5 to 20 inclusive carbon atoms per molecule, by the application to the mixture of a Friedel-Crafts catalyst, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated metal surface containing less than 7% iron, at a critical speed and critical temperature indicated by a 40 foot length of 1 inch diameter pipe, at the temperature of 105 to 250 lbs. steam at a speed of flow such that the polymer is in contact with the hot metal for a time interval not longer than 4 minutes, and thereafter collecting the resin in molten condition in a hot receiver, composed of a metal containing less than 7% iron.

4. In the processing of a fusible copolymeric resin, prepared from a mixture containing from 30% to 80% of a multi-olefin, having from 4 to 14 carbon atoms per molecule, and from 20% to 70% of a mono-olefin, having from 5 to 20 inclusive carbon atoms per molecule, by the application to the mixture of a Friedel-Crafts catalyst, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated metal surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes, and carrying away volatile components by the application to the hot resin material of a stream of super-heated steam, thereafter discharging the heated, steam treated resin into a hot receiver, composed of a metal containing less than 7% iron, and treating it in the hot receiver with a further portion of super-heated steam.

5. In the processing of a fusible copolymeric resin, prepared from a mixture containing from 30% to 80% butadiene, and from 20% to 70% diisobutylene, by the application to the mixture of a Friedel-Crafts catalyst, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated metal surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes.

6. In the processing of a fusible copolymeric resin, prepared from a mixture containing from 30% to 80% of a multi-olefin, having from 4 to 14 carbon atoms per molecule, and from 20% to 70% of a mono-olefin, having from 5 to 20 inclusive carbon atoms per molecule, by the application to the mixture of a Friedel-Crafts catalyst at a temperature within the range between +10° C. and −30° C., the steps in combination of diluting the polymerized mixture with warm, light naphtha to volatilize out un-polymerized material, washing the naphtha solution with mildly alkaline water solution with from 3 to 11 washings; passing the naphtha solution over a heated Monel metal surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes.

7. In the processing of a fusible copolymeric resin, prepared from a mixture containing from 30% to 80% butadiene, and from 20% to 70% diisobutylene, by the application to the mixture of a Friedel-Crafts, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated Monel metal surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes.

8. In the processing of a fusible copolymeric resin, prepared from a mixture containing from 30% to 80% of a multi-olefin, having from 4 to 14 carbon atoms per molecule, and from 20% to 70% of a mono-olefin, having from 5 to 20 inclusive carbon atoms per molecule, by the application to the mixture of a Friedel-Crafts catalyst, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated nichrome alloy surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes.

9. In the processing of a fusible copolymeric resin, prepared from a mixture containing from 30% to 80% butadiene, and from 20% to 70% diisobutylene, by the application to the mixture of a Friedel-Crafts catalyst, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated nichrome alloy surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes.

10. In the processing of a fusible copolymeric resin, prepared from a mixture containing from 30% to 80% isoprene, and from 20% to 70% pentene, by the application to the mixture of a Friedel-Crafts catalyst, at a temperature within the range between +10° C. and −30° C., the steps in combination of diluting the polymerized mixture with warm, light naphtha to volatilize out unpolymerized material, washing the naphtha solution with mildly alkaline water solution with from 3 to 11 washings; passing the naphtha solution over a heated Monel metal surface containing less than 7% iron, at a critical speed and critical temperature indicated by a 40 foot length of 1 inch diameter pipe, at the temperature of 105 to 250 lbs. steam, at a speed of flow such that the polymer is in contact with the hot metal for a time interval not longer than 4 minutes.

JOHN D. GARBER.
WILLIAM J. SPARKS.
DAVID W. YOUNG.

REFERENCES CITED

The following references are of record in the file of this patent:

UNITED STATES PATENTS

| Number | Name | Date |
| --- | --- | --- |
| 1,982,708 | Thomas | Dec. 4, 1934 |
| 2,035,233 | Hachwalt | Mar. 24, 1936 |
| 2,297,722 | Soday | Oct. 6, 1942 |
| 2,297,723 | Soday | Oct. 6, 1942 |
| 2,297,724 | Soday | Oct. 6, 1942 |
| 2,374,242 | Soday | Apr. 24, 1945 |